US008920156B2

(12) United States Patent  
Clark

(10) Patent No.: US 8,920,156 B2  
(45) Date of Patent: Dec. 30, 2014

(54) SUPPORT MEMBER FOR A ROTATABLE PLATEN AND A MOLD IN AN INJECTION MOLDING MACHINE

(71) Applicant: Electroform Company, Rockford, IL (US)

(72) Inventor: Wade L. Clark, Rockford, IL (US)

(73) Assignee: Electroform Company, Rockford, IL (US)

( * ) Notice: Subject to any disclaimer, the term of this patent is extended or adjusted under 35 U.S.C. 154(b) by 141 days.

(21) Appl. No.: 13/676,538

(22) Filed: Nov. 14, 2012

(65) Prior Publication Data

US 2013/0122137 A1 May 16, 2013

Related U.S. Application Data

(60) Provisional application No. 61/559,827, filed on Nov. 15, 2011.

(51) Int. Cl.
| | |
|---|---|
| *B29C 45/66* | (2006.01) |
| *B29C 45/04* | (2006.01) |
| *B29C 45/17* | (2006.01) |
| *B29C 45/06* | (2006.01) |

(52) U.S. Cl.
CPC ........... *B29C 45/045* (2013.01); *B29C 45/1761* (2013.01); *B29C 45/06* (2013.01)
USPC ............ 425/574; 425/576; 425/589; 425/595

(58) Field of Classification Search
USPC .......................... 425/574, 575, 576, 589, 595
See application file for complete search history.

(56) References Cited

U.S. PATENT DOCUMENTS

| 6,402,504 B1 | 6/2002 | Hahn et al. | |
| 6,709,251 B2 * | 3/2004 | Payette et al. | 425/576 |
| 7,186,113 B2 * | 3/2007 | Lichtinger | 425/576 |

OTHER PUBLICATIONS

ENGEL Mold Support, 4 pages, published at least as early as Oct. 12, 2011.
Rotary platens from Braunform, 2 pages, published at least as early as Oct. 4, 2011.
UMS rotary platens by MGS Mfg. Group, 2 pages, published at least as early as Oct. 4, 2011.
Pictures of various guide members of injection molding machines, 3 pages, published at least as early as Nov. 9, 2011.

* cited by examiner

*Primary Examiner* — Tim Heitbrink
(74) *Attorney, Agent, or Firm* — Klintworth & Rozenblat IP LLC

(57) ABSTRACT

Support members for rotatable platens of injection molding machines are provided. In some aspects, an injection molding machine includes a guide member and a rotatable platen including a base plate and a turntable supported by and rotatable relative to the base plate about a substantially horizontal axis. The turntable is adapted to support a mold for rotation about the horizontal axis relative to the base plate and the guide member. The injection molding machine also includes a support member coupled to the rotatable platen and engaged with the guide member for movement of the rotatable platen and the support member along the guide member. The turntable is adapted to rotate the mold relative to the support member. In other aspects, a support member for a rotatable platen of an injection molding machine is provided and includes a first arm and a second arm spaced apart from the first arm.

12 Claims, 6 Drawing Sheets

SUPPORT MEMBER FOR A ROTATABLE PLATEN AND A MOLD IN AN INJECTION MOLDING MACHINE

RELATED APPLICATIONS

The present application claims priority to co-pending U.S. Provisional Patent Application No. 61/559,827, filed Nov. 15, 2011, the entire contents of which are incorporated herein by reference.

FIELD OF THE INVENTION

The present invention generally relates to rotatable platens for supporting molds used in injection molding machines and, more particularly, to a support member for supporting rotatable platens and molds used in injection molding machines.

BACKGROUND

Injection molding machines include numerous moving parts and require precision in all aspects of operation. Injection molding machines include molds into which material is injected to form parts in desired shapes. In some instances, molds may rotate between positions and it is essential that the molds consistently and accurately occupy such positions. Slight deviation from the desired positions may cause the molds to malfunction or form faulty parts, or may damage the molds or other components of the injection molding machine.

Molds used in injection molding processes may have significant weights upwards of several thousands of pounds. Some injection molding machines include vertically orientated rotatable platen assemblies for supporting molds and rotating such molds about a horizontal axis. To support molds in such a manner, one end of the mold is fastened or otherwise coupled to the rotatable platen assembly and the other end of the mold extends horizontally away from the rotatable platen assembly in a cantilevered fashion and is not vertically supported from below. Thus, the unsupported free end of the mold creates a large force on the coupled end of the mold, which may stress the coupled end of the mold and the rotatable platen assembly, ultimately causing the free end of the mold to sag or otherwise be inappropriately positioned. Sagging or inappropriately positioned molds may be misaligned with other components of the injection molding machine, thereby causing the injection molding machine to malfunction, form faulty parts, or possibly damaging the mold or other components of the injection molding machine.

Thus, a need exists for a manner of maintaining proper positioning and alignment of a mold throughout the injection molding process.

SUMMARY

In one example, a support member for a rotatable platen assembly in an injection molding machine is provided. The support member may be coupled to the rotatable platen assembly. Coupling may include unitarily forming the support member with the rotatable platen assembly as one-piece.

In another example, a support member for a mold in an injection molding machine is provided. The mold may be moveable relative to the support member.

In a further example, a support member is provided and is coupled to a rotatable platen assembly in an injection molding machine for providing support to a mold coupled to the rotatable platen assembly. The support member may be fastened to the rotatable platen assembly. The support member may be unitarily formed as one-piece with the rotatable platen assembly. The mold may be rotatable relative to the support member.

In yet another example, a support member for a mold in an injection molding machine is provided. The support member may include a pair of support arms coupled to a rotatable platen assembly and may extend forward of the rotatable platen assembly. A mold may be coupled to the rotatable platen assembly and may rotate relative to and between the support arms. Coupling of the support arms to the rotatable platen assembly may include unitarily forming the support arms and the rotatable platen assembly as one-piece.

In yet a further example, an injection molding machine is provided and includes a guide member and a rotatable platen including a base plate and a turntable supported by and rotatable relative to the base plate about a substantially horizontal axis. The turntable is adapted to support a mold for rotation about the horizontal axis relative to the base plate and the guide member. The injection molding machine also includes a support member coupled to the rotatable platen and engaged with the guide member for movement of the rotatable platen and the support member along the guide member. The turntable is adapted to rotate the mold relative to the support member.

In still another example, a support member for a rotatable platen of an injection molding machine is provided and includes a first arm including a first adjustment member adapted to adjust a position of the first arm within the injection molding machine, and a second arm spaced apart from the first arm and including a second adjustment member adapted to adjust a position of the second arm within the injection molding machine.

Figure 1:
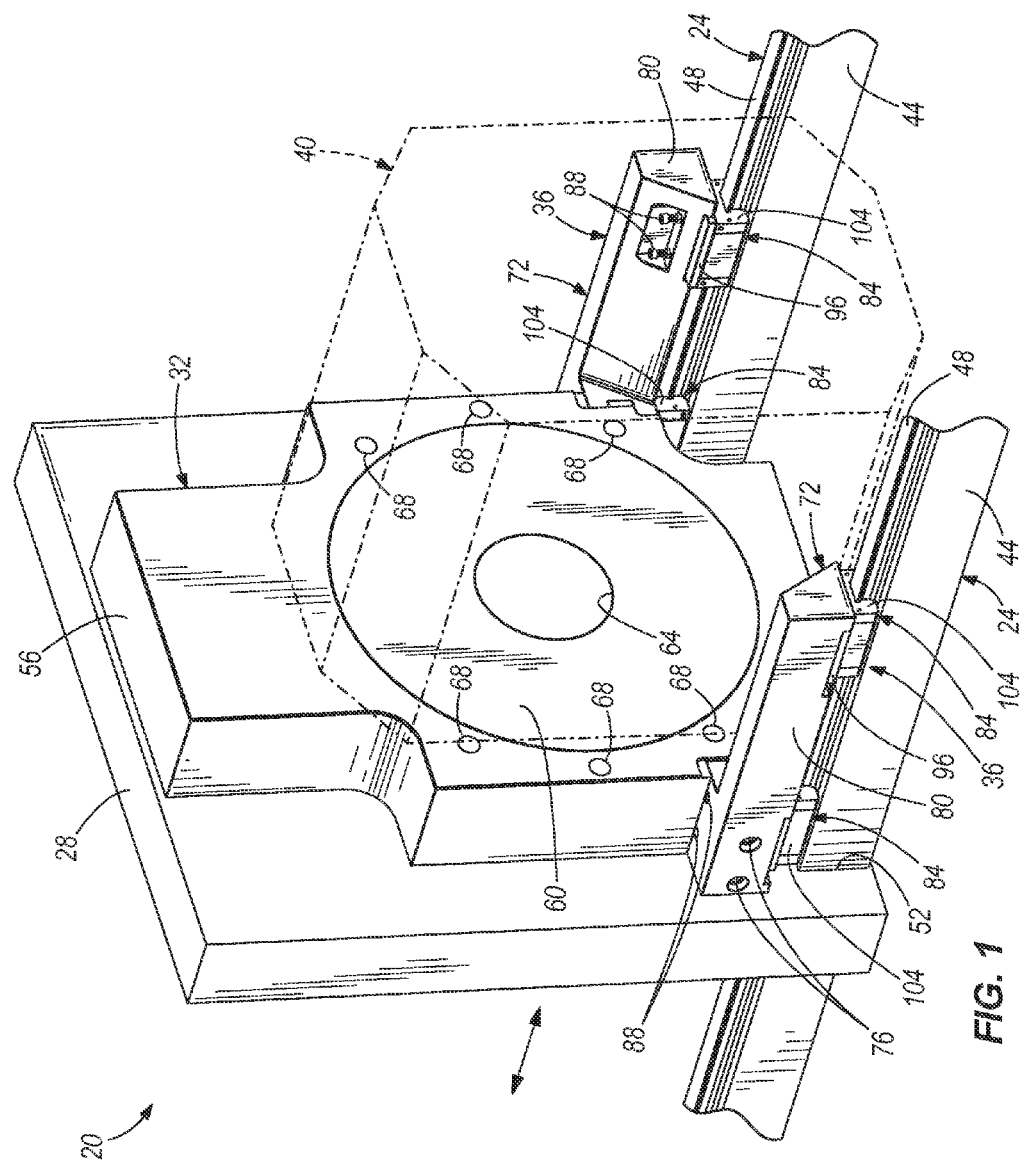
FIG. 1 is a top front perspective view of a portion of an exemplary injection molding machine including an exemplary support member, an exemplary mold is represented in dashed lines and is coupled to the portion of the injection molding machine.
Figure 2:
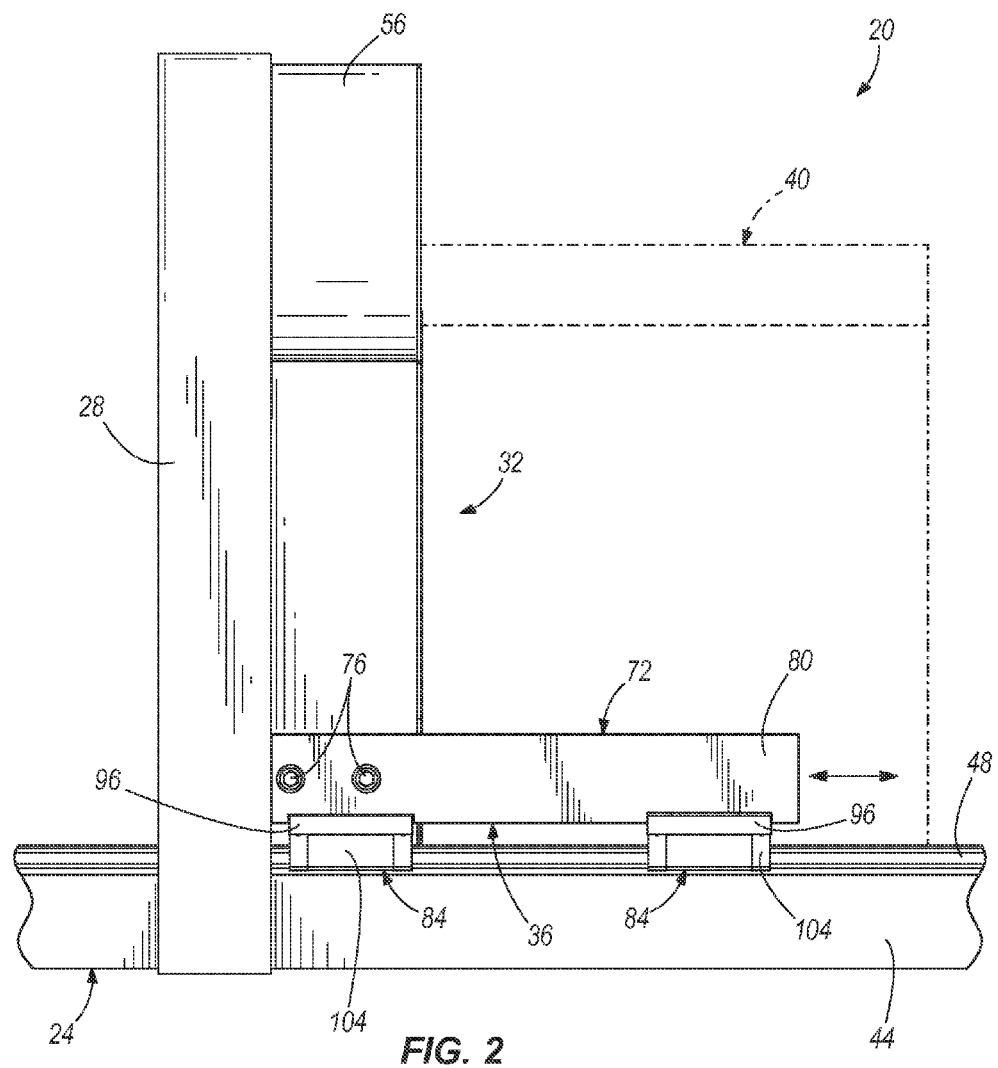
FIG. 2 is a right side view of the portion of the injection molding machine and the support member shown in FIG. 1.
Figure 3:
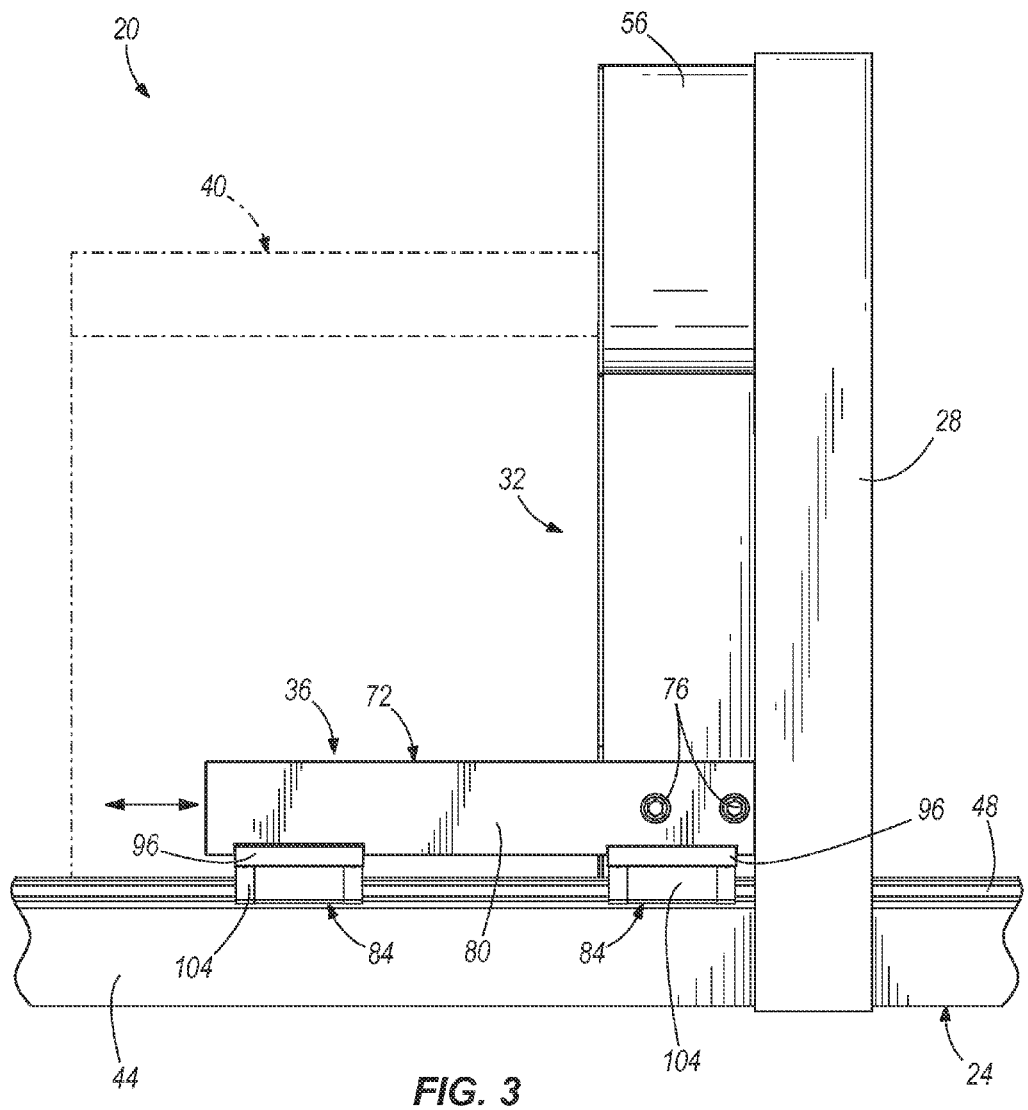
FIG. 3 is a left side view of the portion of the injection molding machine and the support member shown in FIG. 1.
Figure 4:
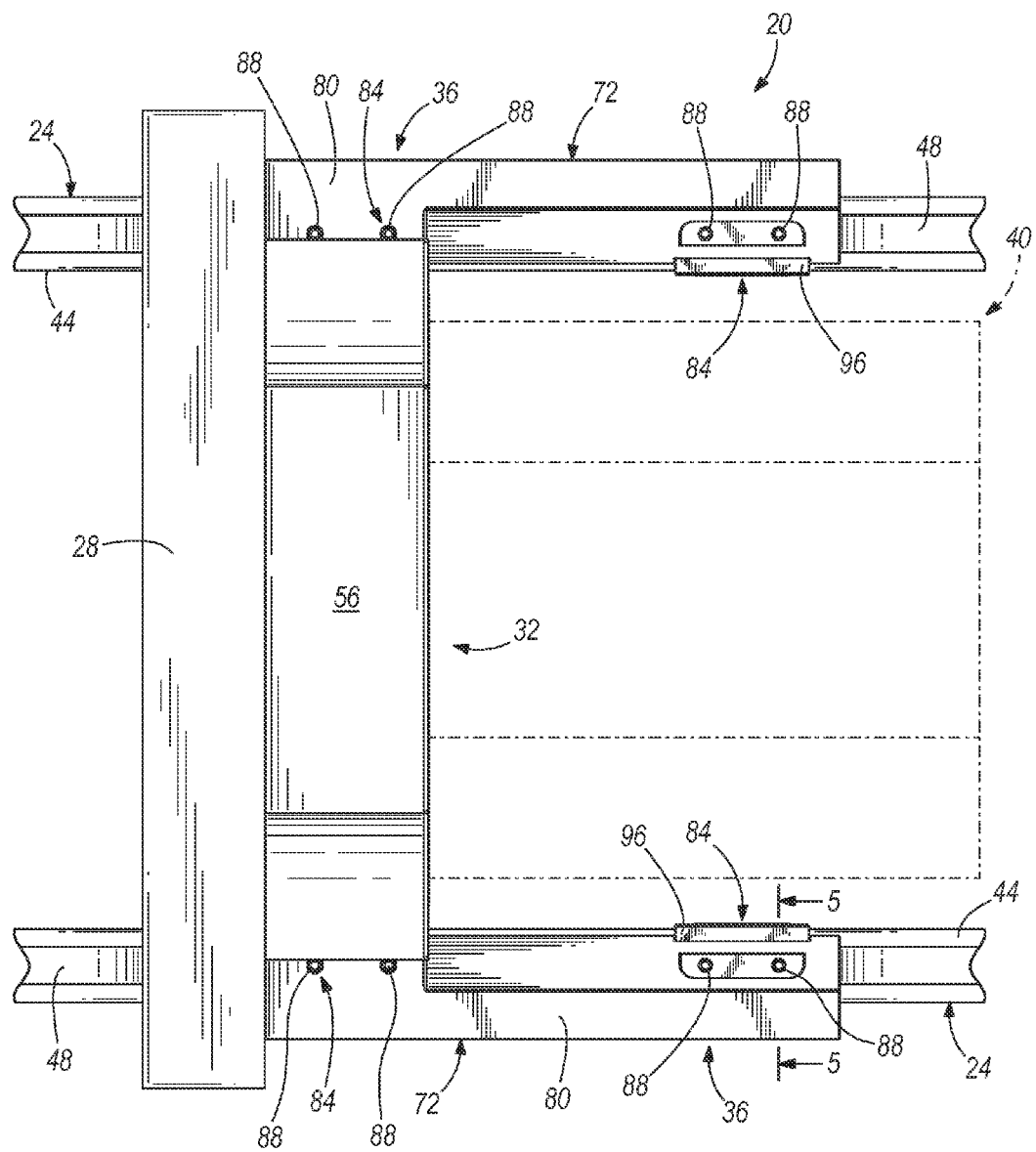
FIG. 4 is a top view of the portion of the injection molding machine and the support member shown in FIG. 1.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

With reference to FIGS. 1-5, an exemplary portion of an injection molding machine 20 is illustrated. The exemplary portion of the injection molding machine 20 includes a pair of guide members 24, a machine platen 28, a rotatable platen or rotatable platen assembly 32, a support member 36, and a mold 40. Injection molding machines operate in a conventional manner and only relevant components and aspects of operation will be described herein.

Injection molding machines commonly include guide members 24 along which various components of the injection molding machine 20 move between various positions in the molding process. In the illustrated exemplary embodiment, the guide members 24 may be considered guide rails, are substantially linear, and components of the injection molding machine 20 move along the guide members 24 in a linear manner. Each guide member 24 includes a base 44 and a guide portion 48 positioned on top of the base 44. It should be understood that the injection molding machine 20 may include other guide members for providing guidance and support to components of the injection molding machine 20 and all of such guide members are intended to be within the spirit and scope of the present invention. For example, the injection molding machine 20 may include guide members that are cylindrical or other shaped tie bars. In embodiments where the injection molding machine 20 includes other guide members, the other components of the injection molding machine 20 are appropriately configured to cooperate with the configuration of the guide members.

In the illustrated exemplary embodiment, the machine platen 28 is oriented in a substantially vertical position and includes two platen apertures 52 defined therethrough. The guide members 24 are positioned in the platen apertures 52 and the machine platen 28 is movable along the guide members 24. The machine platen 28 may be moved along the guide members 24 in any manner such as, for example, by a hydraulic drive, toggle drive, servo drive, pneumatic drive, or screw drive, or any other manner.

The rotatable platen assembly 32 is coupled to the machine platen 28 and includes a base plate 56 and a turntable 60. The base plate 56 is fixed to the machine platen 28 and the turntable 60 is rotatable relative to the machine platen 28 and the base plate 56. In the illustrated exemplary embodiment, the turntable 60 includes a center aperture 64 through which material injection lines and other necessary components may extend to provide a mold 40 with necessary material, power, pneumatics, etc., to adequately perform the molding process. Also, in the illustrated exemplary embodiment, the turntable 60 includes a plurality of fastening apertures 68, which may be used to couple or fasten a mold 40 to the turntable 60. The turntable 60 may include any number of fastening apertures 68 in any configuration and be within the intended spirit and scope of the present invention. It should also be understood that the turntable 60 may include other structure and components for coupling a mold 40 thereto in other manners and all of such possible structures and components are intended to be within the spirit and scope of the present invention. The turntable 60 is adapted to rotate a mold 40 about a substantially horizontal axis extending through a center of the turntable 60 and substantially parallel to the guide members 24. The turntable 60 may rotate the mold 40 in any manner and about any degree range. For example, the turntable 60 may rotate a mold 180-degrees in one direction and 180-degrees in the other direction. Also, for example, the turntable 60 may rotate the mold 90-degrees in one direction and 90-degrees in the other direction. Further for example, the turntable 60 may rotate the mold 40 continuously beyond 360-degrees in any direction as desired.

With continued reference to FIGS. 1-5, the injection molding machine 20 includes a support member 36 for providing support to the rotatable platen assembly 32 and the mold 40 to assist with maintaining proper positioning and alignment of the rotatable platen assembly 32 and the mold 40 during the molding process. In the illustrated exemplary embodiment, the support member 36 includes a pair of support arms 72 with one support arm 72 coupled to each of opposing sides of the rotatable platen assembly 32. Each support arm 72 is coupled to the rotatable platen assembly 32 near one of its ends with the other end of the support arm 72 extending away from the rotatable platen assembly 32 and the machine platen 28 along the guide member 24. In the illustrated exemplary embodiment, the support arms 72 are coupled to the rotatable platen assembly 32 with fasteners 76. Alternatively, the support arms 72 may be coupled to the rotatable platen assembly 32 in other manners such as, for example, welding, bonding, unitarily forming as one-piece, or any other manner. In the illustrated exemplary embodiment, the support arms 72 extend from the same side of the rotatable platen assembly 32 as the mold 40. For purposes of description herein, this direction may be considered a forward direction. However, identification and use of directional orientation herein is not intended to limit the present invention in any manner. The length of the support arms and the distance that the support arms 72 extend in a forward direction may be dependent upon characteristics of the mold. For example, such mold characteristics may include, but are not limited to, the height of the mold, the weight of the mold, and/or a distance the mold extends forward of the turntable. It should be understood that the support arms 72 may have any length and may extend forwardly of the rotatable platen assembly 32 any distance to provide a desired level of support to the rotatable platen assembly 32 and the mold 40. It should also be understood that the support arms 72 may be different lengths relative to each other and that each support arm 72 may extend a different length forward of the rotatable platen assembly 32. It should further be understood that the support member 36 may include only a single support arm 72. Returning to the illustrated exemplary embodiment, the rotatable platen assembly 32 and the support member 36 are configured to allow rotation of the mold 40 relative to and between the support arms 72 of the support member 36.

Each support arm 72 includes a body 80 and a pair of adjustment members 84 spaced-apart along the body 80. In the illustrated exemplary embodiment, each adjustment member 84 includes a pair of threaded members 88 threadably engageable within apertures 92 (see FIG. 6) defined in the body 80, an engagement member 96 coupled to a bottom of the body 80 and defining a pair of recesses 100 (see FIG. 6) defined therein for receiving ends of the threaded members 88, and a bearing member 104 coupled to a bottom of the engagement member 96. The adjustment members 84 may be manipulated to adjust the position (e.g., height, angle of orientation, etc.) of the rotatable platen assembly 32 and the mold 40 in order to properly align the rotatable platen assembly 32 and the mold 40 for the molding process. Each bearing member 104 includes a receptacle 108 (see FIGS. 5 and 6) having a complementary shape to the guide portion 48 of the guide member 24 to receive the guide portion 48 within the receptacle 108. The bearing members 104 ride along the guide members 24 as the machine platen 28, rotatable platen assembly 32, and the mold 40 move forward and backward between molding positions.

Figure 5:
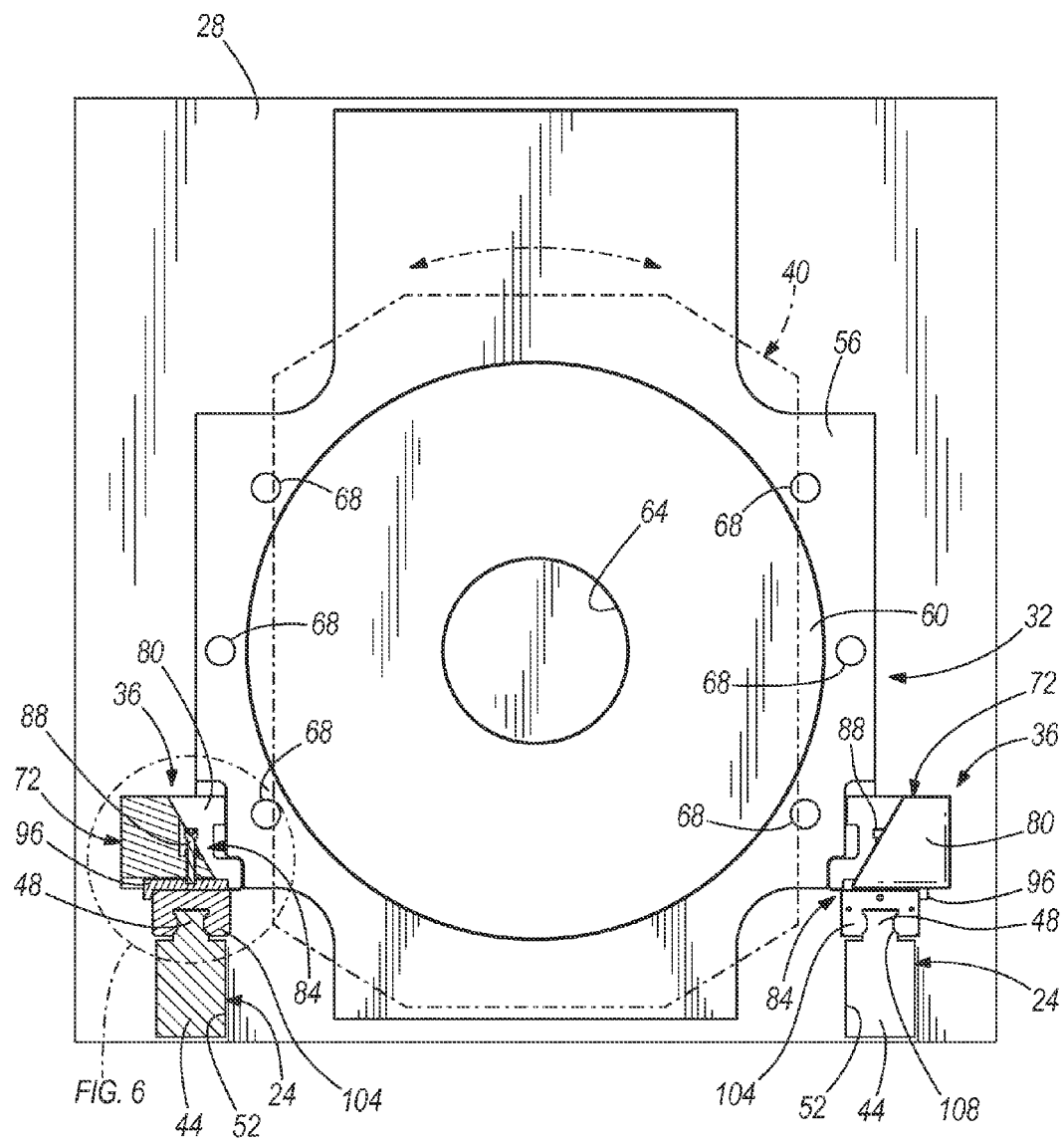
FIG. 5 is a cross-sectional view taken along line 5-5 in FIG. 4, an exemplary adjustment member of the support member is shown.
Figure 6:
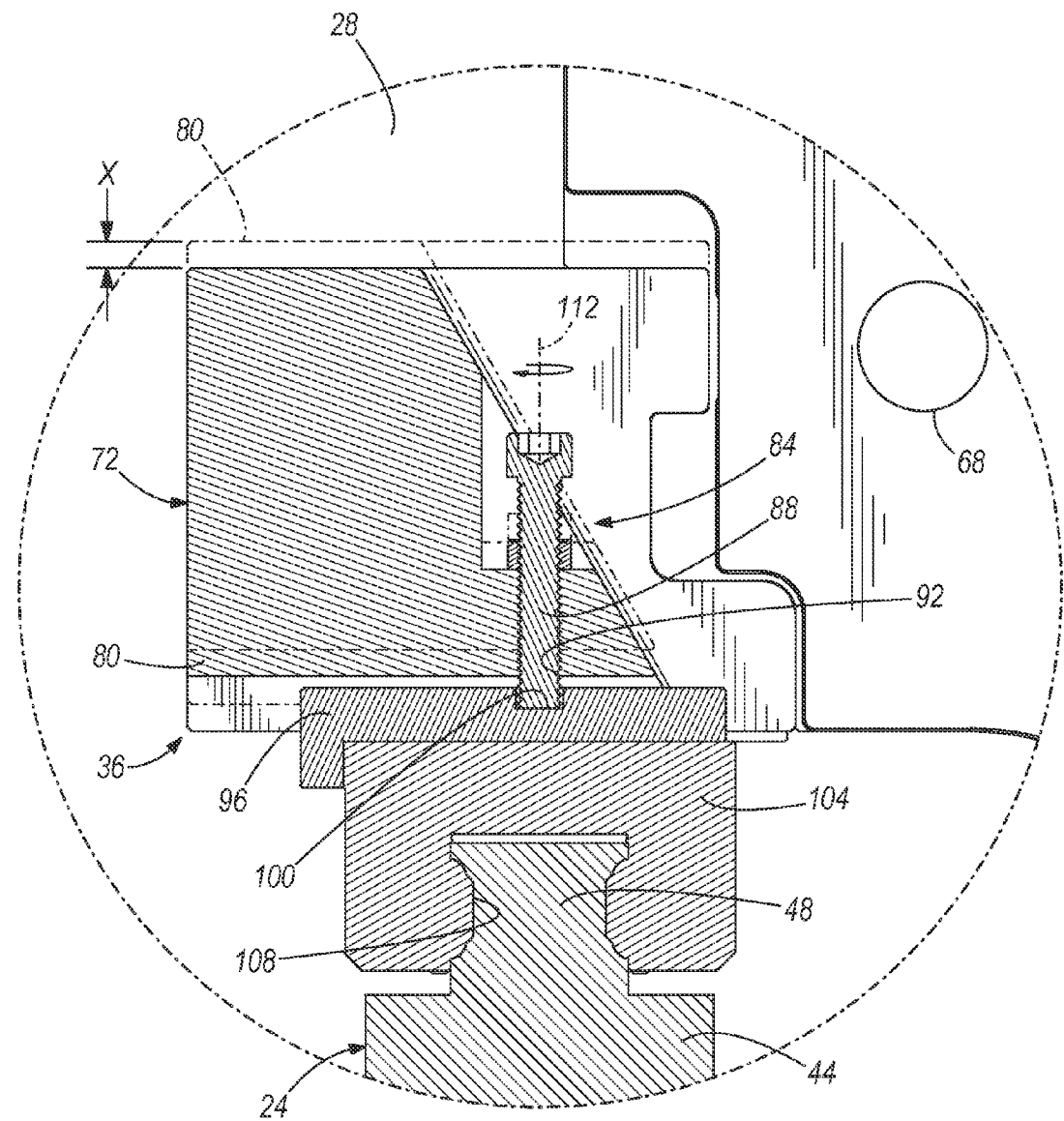
FIG. 6 is an enlarged detail of a portion of FIG. 5, the exemplary adjustment member is shown.

With reference to FIGS. 5 and 6, adjustment of the adjustment members 84 will be described. During adjustment, the bearing member 104 and the engagement member 96 remain vertically fixed in place, the threaded members 88 remain vertically fixed in place, but may rotate about a vertical axis 112, and the support arm 72 is vertically movable. A user may adjust the adjustment member 84 by rotating one or more of the threaded members 88 in a desired direction, which threads the threaded member 88 within the complementary threaded apertures 92 in the support arm 72, thereby causing the support arm 72 to raise or lower relative to the engagement member 96, the bearing member 104, and the guide member 24. By raising or lowering the support arm 72, the rotatable platen assembly 32 and the mold 40 will also raise or lower. The threaded members 88 are rotated until the support arm 72 is raised or lowered a desired amount X (see FIG. 6). With the four provided adjustment members 84, a user has a great capacity for adjustment of the rotatable platen assembly 32 and the mold 40.

It should be understood that the illustrated exemplary embodiment of the adjustment member 84 is only one exemplary embodiment and many other embodiments of adjustment members are possible, all of which are intended to be within the spirit and scope of the present invention. For example, the support member 36 may include any number of adjustment members 84 and may distribute the adjustment members 84 in any ratio among the pair of support arms 72 including the same quantity of adjustment members 84 on each support arm 72 or different quantities of adjustment members 84 on each support arm 72. Also, for example, each adjustment member 84 may include any number of threaded members 88, including one. Further, for example, the adjustment members 84 may not include engagement members 96, but rather ends of the threaded members 88 may engage a top surface of the bearing members 104.

It should also be understood that the support arms 72 may include other types and configurations of adjustment members and all of such adjustment members are intended to be within the spirit and scope of the present invention. For example, a wedge-type adjustment member may be used.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. An injection molding machine comprising:
   a guide member;
   a rotatable platen including a base plate and a turntable supported by and rotatable relative to the base plate about a substantially horizontal axis, wherein the turntable is adapted to support a mold for rotation about the horizontal axis relative to the base plate and the guide member; and
   a support member coupled to the rotatable platen and engaged with the guide member for movement of the rotatable platen and the support member along the guide member, wherein the turntable is adapted to rotate the mold relative to the support member.

2. The injection molding machine of claim 1, wherein the support member is fastened to the rotatable platen with at least one fastener.

3. The injection molding machine of claim 1, wherein the support member is unitarily formed as one-piece with the rotatable platen.

4. The injection molding machine of claim 1, wherein the mold and the support member extend from a same side of the rotatable platen.

5. The injection molding machine of claim 1, wherein the guide member is a first guide member, the injection molding machine further comprising a second guide member and the rotatable platen being positioned between the first guide member and the second guide member, and wherein the support member includes a first arm and a second arm, wherein the first arm is coupled to the rotatable platen and engages the first guide member and the second arm is coupled to the rotatable platen and engages the second guide member for movement of the rotatable platen, the first arm, and the second arm along the first and second guide members.

6. The injection molding machine of claim 5, wherein the turntable supports the mold between the first and second arms and is adapted to rotate the mold relative to and between the first and second arms.

7. The injection molding machine of claim 1, wherein the support member includes an adjustment member adapted to move at least a portion of the support member relative to the guide member.

8. The injection molding machine of claim 7, wherein the adjustment member is at least partially positioned between the support member and the guide member.

9. The injection molding machine of claim 7, wherein the adjustment member includes a first member engaged with the guide member, a second member engaged with the first member and defining a recess therein, and a threaded fastener threadably coupled to the support member, wherein an end of the threaded fastener is positioned in the recess defined in the second member, and wherein the threaded fastener is rotatable relative to the support member to move the support member relative to the first member, the second member, and the guide member.

10. The injection molding machine of claim 1, wherein the support member includes a first adjustment member and a second adjustment member adapted to move at least a portion of the support member relative to the guide member.

11. The injection molding machine of claim 10, wherein each of the first and second adjustment members includes a first member engaged with the guide member, a second member engaged with the first member and defining a recess therein, and a threaded fastener threadably coupled to the support member, wherein an end of the threaded fastener is positioned in the recess defined in the second member, and wherein the threaded fastener is rotatable relative to the support member to move the support member relative to the first member, the second member, and the guide member.

12. The injection molding machine of claim 1, further comprising a machine platen defining an aperture therein with the guide member positioned within the aperture and the machine platen adapted to move along the guide member, and wherein the rotatable platen is coupled to the machine platen.

* * * * *